Sept. 27, 1932.                L. G. CLOHECY                    1,879,921
                         VARIABLE SPEED TRANSMISSION
                            Filed June 25, 1931
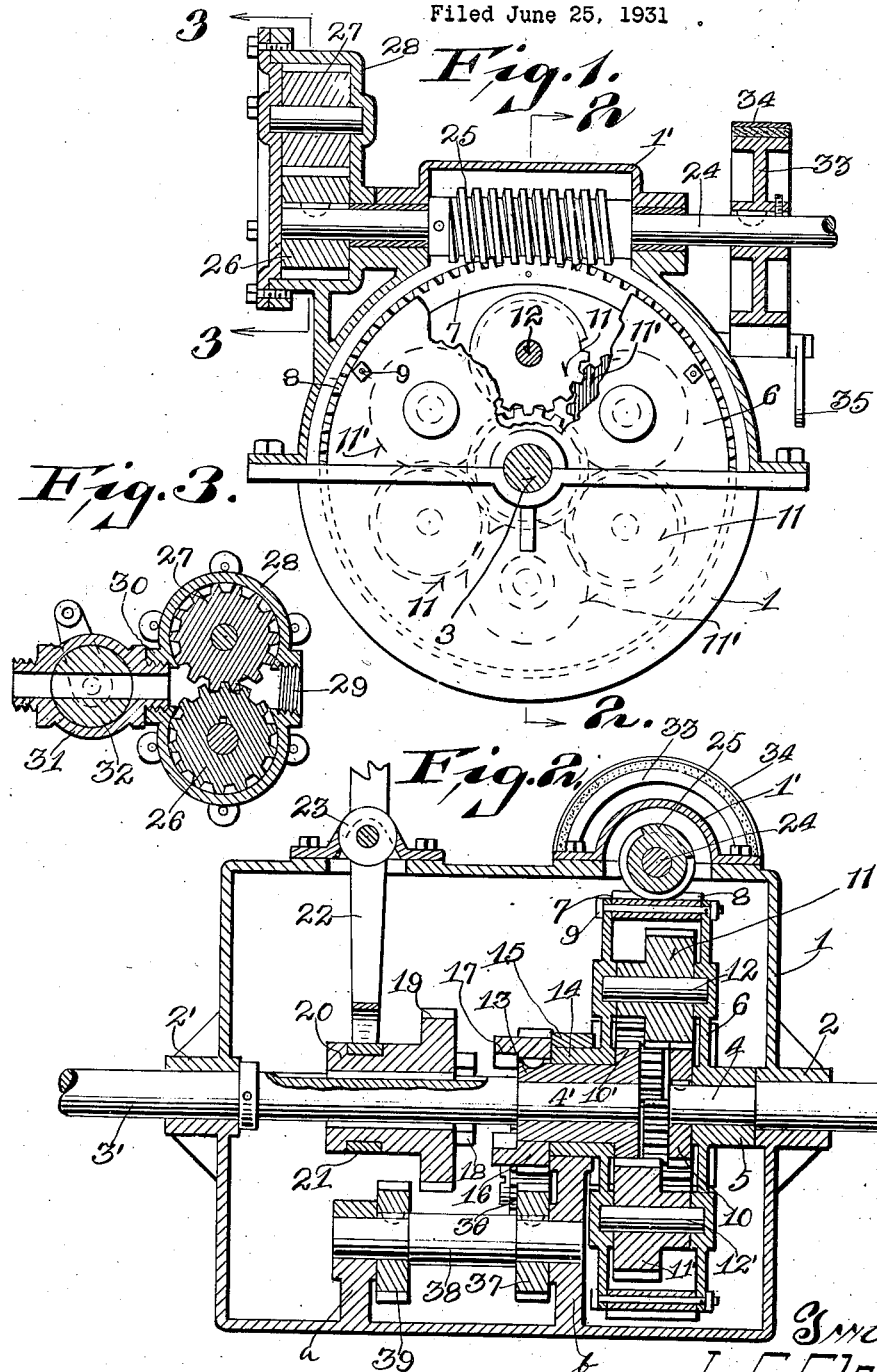

Patented Sept. 27, 1932

1,879,921

UNITED STATES PATENT OFFICE

LEON G. CLOHECY, OF WAUWATOSA, WISCONSIN, ASSIGNOR OF ONE-THIRD TO GEORGE G. BRUMDER, OF MILWAUKEE, WISCONSIN, AND ONE-THIRD TO WALTER C. MAYER, OF MILWAUKEE, WISCONSIN

VARIABLE SPEED TRANSMISSION

Application filed June 25, 1931. Serial No. 546,699.

This invention relates to improved variable speed transmissions.

One of the objects of the present invention is the provision of a device of the above character which includes novel means for connecting the input and the output shafts, whereby hydraulic means is used in the connection of the two shafts to provide for simultaneous motion, and wherein the connecting means is permitted to run idle when no movement is required of the output shaft.

Another object of the present invention is the provision of novel means for connecting an input and output shaft, hydraulically controlled with suitable clutch mechanism for imparting a driving movement to the output shaft, together with suitable means operatively connected with the transmission mechanism for driving the output shaft in an opposite direction.

A further object of the invention is the provision of a variable speed transmission including an input shaft having a gear mounted thereon, cooperating with a plurality of idle pinions circumferentially arranged within a rotary housing, having a circumferential gear on the exterior thereof and an output shaft having a gear upon the inside of the housing, meshing with the pinions therein, whereby when no retarding movement is applied to the housing, the housing will rotate around the gear carried by the output shaft, together with hydraulic means for retarding the movement of the housing, whereby the movement conveyed to the pinions therein, through the connection of the input shaft, will drive the gear on the output shaft.

With the above and other objects in view, the invention consists in the novel features of construction the combination and arrangement of parts hereinafter more fully set forth, pointed out in the claims and shown in the accompanying drawing wherein:

Figure 1 is an end elevation with parts broken away and illustrated in cross section;

Figure 2 is a sectional view on the line 2—2 of Figure 1; and

Figure 3 is a sectional view on the line 3—3 of Figure 1.

Referring to the drawing, it will be noted that the major portion of the mechanism is enclosed within a suitable housing 1, having bearings 2 and 2' at each end thereof. Extending into the housing and rotatably mounted in the bearing 2 is the input shaft 3. The inner end of this shaft has a reduced portion 4 arranged within the sleeve 5, extending laterally from one side of a rotary cylindrical housing 6. The outer circumferential portion of the housing 6 is closed by means of a circular plate 7, the outer face of which is formed with a plurality of gear teeth 8. This plate 7 is retained in position between the side walls of the housing 6 by means of bolts 9 which extend transversely through the walls of the housing and through the plate 7.

Mounted upon the inner end of the reduced portion 4 of the input shaft 3 is a spur-gear 10 adapted to co-operate with a plurality of circumferentially arranged pinions 11 within the housing 6. These pinions 11 are supported upon the stub shafts 12, the ends of which are mounted within suitable bearings in the side walls of the housing 6.

It will be noted that the pinions 11 which cooperate with the gear 10 are arranged upon one side of the housing and cooperate with a second set of pinions 11' arranged upon the opposite side of the housing. These pinions 11' are also mounted upon stub shafts 12', the ends of which are mounted in suitable bearings in the side walls of the housing 6.

It will be apparent from the arrangement of pinions 11 and 11' that the pinions 11' and the gear 10 rotate in the same general direction.

Rotatably mounted in the bearing 2' is the output shaft 3' provided with an inner reduced end 4'. Mounted upon the reduced end 4' is a gear 10' having an elongated sleeve 13 which extends the full length of the reduced portion 4' and is arranged within the sleeve 14 carried by the opposite wall of the housing 6 from the sleeve 5. The sleeve 14 is rotatably mounted within a suitable bearing 15, extending upwardly from the bottom of the housing 1.

The gear 10' is rotated in a direction opposite the gear 10 through the engagement thereof with pinions 11 and 11', thus rotating the output shaft 3' in a direction opposite the rotation of shaft 3.

Extending transversely of the main housing 1, is an auxiliary housing 1' and mounted within suitable bearings in the auxiliary housing 1' is a shaft 24, carrying a spiral 25 which cooperates with the gear teeth 8 on the exterior of the cylindrical housing 6. Keyed to one end of the shaft 24 is a pinion 26, meshing with a pinion 27, with the both pinions enclosed within a suitable pump housing 28. The pump housing 28 is provided with an inlet opening 29 and with an outlet 30 to which a valve housing 31 is connected. Within the housing 31 is a rotary valve 32 controlling the passage of fluid from the outlet 30.

Attached to the shaft 24 is a brake drum 33 and cooperating with the drum is a brake band 34 actuated by means of a hand lever 35. It will be apparent from the foregoing that when the valve 32 is in its open position, as shown in Figure 3, the fluid will pass directly through the housing 28 without retarding the movement of the pinions 26 and 27 in any way whatever. This action permits the housing 6 to rotate simultaneously with the shaft 3, causing the pinions 11 and 11' to rotate around the gears 10 and 10'. However, as soon as the valve 32 begins to close to restrict the movement of the fluid around the pinions 26 and 27, the rotation of the housing 6 is retarded, causing the rotation of the pinions 11 and 11' to be conveyed to the gear 10', which in turn will rotate the gear 16, and if the clutch mechanism is in engagement, a similar rotative movement will be imparted to the output shaft 3'.

Due to the arrangement of the gears 10 and 10' and the pinions 11 and 11', the shafts 3 and 3' will be rotated in opposite directions when the clutch members 18 are engaged with the clutch face 17. However, in order to reverse the direction of rotation of the output shaft 3', a pinion 36 normally meshes with the gear 16 and cooperates with a gear 37 on stub shaft 38.

The stub shaft 38 is rotatably mounted in suitable bearings carried by the standards *a* and *b* within the housing 1 and the shaft 38 also carries a gear 39 which is adapted to cooperate with the gear 19 when it is desired to reverse the rotation of shaft 3'. To carry out this operation, the clutch members 17 and 18 are disengaged and the sleeve 20 is moved along the shaft 3' by means of the lever 22 until the gear 19 is thrown into engagement with the gear 39. From this, it will be apparent that the drive is then through the gear 19 to shaft 3'.

It will be apparent that the relative position of the valve 32 will govern the speed of the housing 6 and as the speed of the housing 6 is lowered, the speed of shaft 3' will be increased due to the fact that the movement of the pinions 11' around the gear 10' will be decreased, causing the drive between the gears 10 and 10' to be more direct. On the other hand, when the valve 32 is fully opened, as shown in Figure 3, the housing 6 will rotate around the gear 10' and not impart any movement to the shaft 3'.

In order to take care of any leakage through the housing 28 which would impart rotative movement on the part of the housing 6, the brake band 34 can be tightened against the drum 33 to positively retain the housing 6 against movement, thus causing the two shafts 3 and 3' to operate in unison.

It will also be noted that as soon as the brake band 34 is released and the valve 32 is operated to permit passage of fluid thru the housing 28, the speed of the shaft 3' will be decreased.

Attention is directed to the fact that this type of transmission is very simple in construction and a variable speed can be conveyed to the shaft 3' through the operation of the valve 32 and through the slidable mounting of the sleeve 20 on the shaft 3', the rotation of shaft 3' may be quickly and readily reversed by simply disconnecting the gear 19 from the gear 16 and connecting this gear 19 up with gear 39. Normally, the gears 37 and 39 are rotating with gear 16.

I claim:

1. A variable speed transmission comprising a stationary casing, input and output shafts extending into the opposite ends of the casing, a circular housing rotatably mounted within the casing having peripheral teeth, the inner end of the input shaft rotatably extending into the rotatable housing at the axial center thereof, a pinion secured to the input shaft, a series of gears rotatably mounted within the housing meshing with the pinion, a second series of circumferential gears rotatably mounted in the housing and driven from the first mentioned series of gears rotatably mounted in the housing, an axially disposed gear meshing with the second series of rotatable gears, means operatively connecting the last mentioned gear with the output shaft, a transversely extending shaft rotatably carried by the casing having a worm meshing with the peripheral teeth of the housing, and means for creating a drag on the last mentioned shaft.

2. A variable speed transmission comprising a stationary casing having an input and an output shaft extending into the same from the opposite ends thereof, a rotatable circular housing having peripheral teeth arranged in the casing between the input shaft and the output shaft, the inner end of the input shaft extending into one side of the rotatable housing at its axial center, a drive gear secured to the inner end of the input shaft and arranged within said housing, a set of circumferentially disposed idle gears rotatably carried by the housing and meshing with the drive gear, a driven gear rotatably mounted within the axial center of the housing, a second set of circumferentially arranged gears meshing with the driven gear and the first set of circumferentially arranged gears, a clutch for releasably connecting the output shaft with the driven gear, a transversely extending shaft rotatably carried by the casing having a worm meshing with the peripheral teeth of the housing, and means for retarding rotation of the transversely extending shaft including a hydraulic pump on one end of the shaft and a mechanical brake on the other end of the shaft.

In testimony that I claim the foregoing I have hereunto set my hand.

LEON G. CLOHECY.